United States Patent [19]

Bertus et al.

[11] 4,263,130

[45] Apr. 21, 1981

[54] PROCESS FOR CRACKING HYDROCARBONS WITH A CATALYST PASSIVATED WITH AN ANTIMONY TRIS (HYDROCARBYL SULFIDE)

[75] Inventors: Brent J. Bertus; Dwight L. McKay; Harold W. Mark, all of Bartlesville, Okla.

[73] Assignee: Phillips Petroleum Company, Bartlesville, Okla.

[21] Appl. No.: 78,635

[22] Filed: Sep. 25, 1979

Related U.S. Application Data

[62] Division of Ser. No. 926,697, Jul. 25, 1978, Pat. No. 4,190,552.

[51] Int. Cl.³ .................. C10G 9/16; C10G 11/06; C07F 9/90
[52] U.S. Cl. .............. 208/113; 208/48 AA; 208/52 CT; 208/119; 252/411 R; 252/430; 260/446
[58] Field of Search .............................. 208/113, 120

[56] References Cited

U.S. PATENT DOCUMENTS

| 2,129,693 | 9/1938 | Houdry | 208/119 |
| 3,711,422 | 1/1973 | Johnson et al. | 252/414 |
| 4,025,458 | 5/1977 | McKay | 252/416 |
| 4,036,940 | 7/1977 | Readal et al. | 208/120 |
| 4,111,845 | 9/1978 | McKay | 208/120 |
| 4,141,858 | 2/1979 | McKay | 208/120 X |
| 4,148,712 | 4/1979 | Nielsen et al. | 208/78 |
| 4,153,536 | 5/1979 | McKay | 208/120 |

FOREIGN PATENT DOCUMENTS 729167  3/1966  Canada ................. 208/120

Primary Examiner—Delbert E. Gantz
Assistant Examiner—G. E. Schmitkons

[57] ABSTRACT

A hydrocarbon cracking process employing a catalyst treated with an antimony tris (hydrocarbyl sulfide) to passivate thereon contaminating metals, e.g., vanadium iron, and/or nickel is disclosed. Used or unused catalyst can be treated and then employed in the process.

6 Claims, No Drawings

PROCESS FOR CRACKING HYDROCARBONS WITH A CATALYST PASSIVATED WITH AN ANTIMONY TRIS (HYDROCARBYL SULFIDE)

This is a divisional of Ser. No. 926,697, filed July 25, 1978, now U.S. Pat. No. 4,190,552.

This invention relates to cracking of a hydrocarbon. In one of its aspects the invention relates to a process of cracking a hydrocarbon, e.g., a hydrocarbon oil, with a catalyst which has been treated to passivate a contaminating metal whenever it appears thereon.

In one of its concepts the invention provides a catalytic cracking operation suited for the beneficiation of a hydrocarbon, e.g., a hydrocarbon oil, which comprises contacting the catalyst, used or unused, with an antimony tris (hydrocarbyl sulfide) and employing the treated catalyst to convert a hydrocarbon, e.g., a petroleum oil.

Cracking catalysts, when used to crack oil that contains metals, e.g, vanadium, iron, and nickel, accumulate a deposit of these metals. This decreases the yield of gasoline and increases the yield of hydrogen and coke.

This invention provides a process for cracking a hydrocarbon with a catalyst treated by addition of an antimony tris (hydrocarbyl sulfide) thereto to passivate the metals thereon.

Metals-contaminated cracking catalysts that are passivated for use according to the invention are any that are active to crack hydrocarbons in the absence of added hydrogen. Included are catalysts or contact masses which are amorphous silica/alumina and compositions that contain zeolites—synthetic or natural.

Such cracking catalyst materials can be any of those cracking catalysts conventionally employed in the catalytic cracking of hydrocarbons boiling above 400° F. (204° C.) for the production of gasoline, motor fuel blending components and light distillates. These conventional cracking catalysts generally contain silica or silica-alumina. Such materials are frequently associated with zeolitic materials. These zeolitic materials can be naturally occurring, or they can be produced by conventional ion exchange methods such as to provide metallic ions which improve the activity of the catalyst. Zeolite-modified silica-alumina catalysts are particularly applicable in this invention.

Examples of cracking catalysts into or onto which antimony can be incorporated include hydrocarbon cracking catalysts obtained by admixing an inorganic oxide gel with an aluminosilicate and aluminosilicate compositions which are strongly acidic as a result of treatment with a fluid medium containing at least one rare earth metal cation and a hydrogen ion, or ion capable of conversion to a hydrogen ion. The unused catalytic cracking material employed will generally be in particulate form having a particle size principally within the range of about 10 to about 200 microns.

If desired, the cracking catalyst can contain a combustion promoter such as platinum or chromium.

The unused catalytic cracking material as employed in the present invention contains essentially no nickel, vanadium or iron. Particularly and preferably, the nickel, vanadium and iron metals content of the unused catalytic cracking material which constitutes the major portion of the unused cracking catalyst of this invention is defined by the following limits:

| | |
|---|---|
| nickel | 0 to 0.02 weight percent |
| vanadium | 0 to 0.06 weight percent |
| iron | 0 to 0.8 weight percent |

The weight percentages in this table relate to the total weight of the unused catalytic cracking material including the metals nickel, vanadium, and iron, but excluding the added antimony modifying agents. The contents of these metals on the cracking catalyst can be determined by standard methods well known in the art, e.g., by atomic absorption spectroscopy or by X-ray fluorescence spectroscopy.

The catalytic cracking materials can vary in pore volume and surface area. Generally, however, the unused cracking catalyst will have a pore volume in the range of about 0.1 to about 1 ml/g. The surface area of this unused catalytic cracking material generally will be in the range of about 50 to about 500 m$^2$/g.

The catalysts which are treated according to the invention are usually employed for cracking of a hydrocarbon feedstock at an elevated temperature to produce distillates such as gasoline and higher-boiling hydrocarbon fuels, e.g., kerosine, diesel fuel, burning oils and the like.

It is an object of this invention to provide a hydrocarbon cracking operation in which metals tending to contaminate a catalyst employed in the operation, thereby reducing its effectiveness or efficiency, are passivated. It is a further object of the invention to provide such an operation which employs the catalyst treated in a manner to cause it to become passivated whenever it is contaminated.

Other aspects, concepts, objects and the several advantages of the invention are apparent from a study of this disclosure and the appended claims.

According to the invention there is provided a method for treating a catalyst suitable for hydrocarbon conversion which comprises adding to said catalyst an antimony tris (hydrocarbyl sulfide).

Still according to the invention, there is provided a catalytic cracking operation suitable for cracking a hydrocarbon oil which comprises adding to the catalyst, used or unused, an antimony tris (hydrocarbyl sulfide).

When the catalyst is an unused cracking catalyst it is treated with antimony tris (hydrocarbyl sulfide) to reduce its susceptibility to the deleterious effects of later-deposited vanadium, iron, and nickel.

To modify or to passivate the metal, when it has been deposited on the catalyst, the quantity of antimony to use should add about 0.01 to 8 weight percent, preferably about 0.02 to 2 weight percent, of antimony to the catalyst. These concentrations are expressed as the element, and are based on the weight of catalyst prior to treatment.

A variety of methods can be used to apply the antimony tris (hydrocarbyl sulfide) to the catalyst. They can be added as a finely divided solid and dispersed by rolling, shaking, stirring, etc. Or, they can be dissolved in a suitable solvent, aqueous or organic, and the resulting solution used to impregnate the cracking catalyst—followed by drying to remove the solvent. Or, they can be dissolved or suspended in the oil that is the feedstock to the cracking process where, by virtue of their negligible vapor pressure at reaction conditions, they are retained on the catalyst.

The antimony tris (hydrocarbyl sulfides) that are effective in this invention are (RS)₃Sb where R contains preferably not more than 18 carbon atoms and can be an alkyl, alkenyl, cycloalkyl, cycloalkenyl, or aryl radical, or a combination of radicals such as alkaryl, aralkyl, alkenylaryl, and the like. Examples of suitable compounds are antimony tris (ethyl sulfide), antimony tris (cyclohexyl sulfide), antimony tris (tetradecyl sulfide), antimony tris (thiophenoxide), antimony tris (benzyl sulfide), and antimony tris (dibutylphenyl sulfide).

Feedstocks amenable to treatment by the cracking catalyst of this invention are, generally, oils having an initial boiling point above 204° C. This includes gas oils, fuel oils, topped crude, shale oil, and oils from coal and/or tar sands. However the oils are derived or obtained, the invention is applicable to passivate the metals on the catalyst when thereon. The cracking process may utilize a fixed catalyst bed or a fluidized catalyst—the latter is preferred.

Specific conditions in the cracking zone and the regeneration zone of a fluid catalytic cracker depend on the feedstock used, the condition of the catalyst, and the products sought. In general, conditions in the cracking zone include Temperature: 427°–649° C. (800°–1200° F.)
Contact Time: 1–40 seconds
Pressure: 10 kiloPascals to 21 megaPascals (0.1 to 205 atm.)
Catalyst:oil ratio: 3/1 to 30/1, by weight, and conditions in the regenerator include
Temperature: 538°–816° C. (1000°–1500° F.)
Contact time: 2–40 minutes
Pressure: 10 kiloPascals to 21 megaPascals (0.1 to 205 atm.)
Air Rate (at 16° C., 1 atm.): 100–250 ft³/lb coke, or 6.2–15.6 m³/kg coke It is presumed that the feedstock to the catalytic cracker, as described above, will contain a significant concentration of vanadium, iron, and/or nickel whose presence will affect adversely the catalyst's selectivity. Since these metals become concentrated in the least volatile fractions, cracking the heavy oils is probably the most important application for the passivated catalyst of this invention. The quantity of added antimony required to passivate vanadium, iron, and nickel is related directly to their concentration in the feedstock. The following table relates the total concentration in the feedstock of these metals to the concentration of added antimony on the cracking catalyst to passivate effectively these adventitious metals.

| Total V, Fe, Ni in Feedstock, ppm | Antimony added to Catalyst, wt %* |
|---|---|
| 40–100 | 0.05–0.8 |
| 100–200 | 0.1–1 |
| 200–300 | 0.15–1.5 |
| 300–800 | 0.2–2 |

*Based on weight of catalyst prior to addition of antimony passivating agent. Quantities are expressed as the element.

This invention is illustrated by the following example.

EXAMPLE I

Preparation of antimony tris (thiophenoxide). This compound was prepared by a double decomposition reaction between antimony trichloride and thiophenol. A slurry containing 14.1 g (0.0618 moles) of antimony trichloride in about 100 cc benzene was dehydrated by distilling until production of azeotrope ceased. After cooling this, a solution of 16.5 g (0.15 moles) of thiophenol in about 50 cc of benzene was added slowly. When addition of the thiophenol was completed the mixture was again heated to reflux and maintained at that temperature for 2 hours more. The resulting solution of antimony tris (thiophenoxide) was calculated to contain 6.36 wt% Sb. Part of it was used to treat a catalyst for testing, as outlined below.

A commercial cracking catalyst that had been used in a commerical fluid catalytic cracker until it had attained equilibrium composition with respect to metals accumulation (catalyst was being removed from the process system at a constant rate) was used to demonstrate passivation with antimony. The catalyst, being a synthetic zeolite combined with amorphous silica/alumina (clay), was predominantly silica and alumina. Concentrations of other elements together with pertinent physical properties are shown in Table I.

TABLE I

| Surface area, m²g⁻¹ | 74.3 |
|---|---|
| Pore volume, ml g⁻¹ | 0.29 |
| Composition, wt % | |
| Nickel | 0.38 |
| Vanadium | 0.60 |
| Iron | 0.90 |
| Cerium | 0.40 |
| Sodium | 0.39 |
| Carbon | 0.06 |

A portion of this used, metals-contaminated catalyst was treated with antimony as follows. A solution, prepared by diluting 2.43 g of antimony tris (thiophenoxide) in benzene (see above) with 30 cc of benzene, was stirred into 25 g of the used catalyst. Solvent was removed by heating, with stirring on a hot plate at about 260° C. This treatment added 0.62 wt% antimony to the catalyst. The treated catalyst was then prepared for testing by aging it. The catalyst, in a quartz reactor, was fluidized with nitrogen while being heated to 482° C., then it was fluidized with hydrogen while the temperature was raised from 482° to 649° C. Maintaining that temperature, fluidization continued for 5 minutes with nitrogen, then for 15 minutes with air. The catalyst was then cooled to about 482° C., still being fluidized with air. The catalyst was then aged through 10 cycles, each cycle being conducted in the following manner. The catalyst at about 482° C. was fluidized with nitrogen for one minute, then heated to 510° C. during two minutes while fluidized with hydrogen, then maintained at 510° C. for one minute while fluidized with nitrogen, then heated to about 649° C. for 10 minutes while fluidized with air, and then cooled to about 482° C. during 0.5 minutes while fluidized with air. After 10 such cycles it was cooled to room temperature while being fluidized with nitrogen, and was ready for testing.

The used and the antimony-treated catalysts were tested in a fixed bed reactor using Kansas City gas oil as feedstock to the cracking step. The cracking reaction was carried out at about 482° C. and atmospheric pressure for 0.5 minutes; regeneration was at about 593° C. and atmospheric pressure; the reactor was purged with nitrogen before and after each cracking step.

Properties of the Kansas City gas oil used in the cracking steps are summarized in Table II.

TABLE II

| API Gravity at 15.6° C. | 30.2° |
|---|---|
| BMCI | 30.1 |

TABLE II-continued

| | |
|---|---|
| Carbon Residue, Ramsbottom | 0.23 wt % |
| Analysis for some elements | |
| Carbon | 88.3 wt % |
| Hydrogen | 11.8 wt % |
| Sulfur | 0.20 wt % |
| Oxygen | 0.075 wt % |
| Nitrogen | 0.08 wt % |
| Nickel | 0.25 ppm |
| Vanadium | 9. ppm |
| Molecular wt. (number average) | 328 |
| Distillation (by ASTM D 1160-61) | |
| 2% | 288° C. |
| 10 | 320 |
| 20 | 340 |
| 30 | 357 |
| 50 | 399 |
| 70 | 458 |
| 90 | 542 |
| Kinematic viscosity (by ASTM D 445-65) | |
| at 54.4° C. | 62.5 centistokes |
| at 98.9° C. | 39.3 centistokes |

Results of the tests using the two catalysts are summarized in Table III.

TABLE III

| | | | Yield | | |
|---|---|---|---|---|---|
| Catalyst | Catalyst: oil weight ratio | Conversion, vol % of feed | Coke, wt % of feed | SCF H₂/bbl feed converted | Gasoline, vol % of feed |
| Used | 7.13 | 72.4 | 9.4 | 707 | 44.3 |
| Used + 0.62 wt % Sb | 7.23 | 76.2 | 7.6 | 334 | 54.4 |

This comparison of the two catalysts shows that, at essentially identical conditions, the addition of 0.62 wt% antimony as antimony tris (thiophenoxide) increased conversion by 5.2%, increased gasoline yield by 23%, descreased coke production by 19%, and decreased the yield of hydrogen by 53%.

U.S. Pat. No. 3,711,422, Marvin M. Johnson and Donald C. Tabler, Jan. 16, 1973, discloses and claims restoring the activity of a cracking catalyst with a compound of antimony, e.g., antimony triphenyl. U.S. Pat. Nos. 4,025,458, May 24, 1977 and 4,031,002, June 21, 1977, Dwight L. McKay, disclose and claim passivating metals on cracking catalysts with antimony compounds, e.g., a phosphorodithioate, as described in the patents.

Reasonable variation and modification are possible within the scope of the foregoing disclosure and the appended claims to the invention the essence of which is that a method for cracking a hydrocarbon, e.g., a hydrocarbon oil, has been set forth employing a catalyst suitable for cracking hydrocarbon, e.g., a hydrocarbon oil, treated with an antimony tris (hydrocarbyl sulfide) to passivate contaminating metal, e.g., vanadium, iron, and/or nickel, whenever it appears thereon.

We claim:

1. A process for cracking a hydrocarbon oil employing a cracking catalyst, the effectiveness of which can be reduced by a contaminating metal deposited thereon from said hydrocarbon, which comprises passivating metal on said catalyst whenever it appears by adding to said catalyst an antimony tris (hydrocarbyl sulfide).

2. A process according to claim 1 wherein the antimony compound is antimony tris (thiophenoxide).

3. A process according to claim 1 wherein the antimony tris (hydrocarbyl sulfide) is represented by the formula $(RS)_3Sb$ wherein R contains not more than 18 carbon atoms.

4. A process according to claim 3 wherein the antimony compound is at least one selected from antimony tris (ethyl sulfide), antimony tris (cyclohexylsulfide), antimony tris (tetradecyl sulfide), antimony tris (thiophenoxide), antimony tris (benzyl sulfide), and antimony tris (dibutylphenyl sulfide).

5. A process according to claim 1 wherein the contaminating metal is one of nickel, vanadium and iron.

6. A process according to claim 4 wherein the contaminating metal is one of nickel, vanadium and iron.

* * * * *